United States Patent [19]
Land

[11] Patent Number: 5,951,825
[45] Date of Patent: Sep. 14, 1999

[54] CONVERTIBLE DISTILLATION APPARATUS

[76] Inventor: Glenn E. Land, New River Mountain Estates, Rte. 2, Box 338, Independence, Va. 24348

[21] Appl. No.: 08/824,267

[22] Filed: Mar. 26, 1997

[51] Int. Cl.⁶ .................................. B01D 3/02; C02F 1/18
[52] U.S. Cl. ..................... 202/83; 202/185.3; 202/185.6; 202/189; 202/190; 202/242; 203/10; 203/100
[58] Field of Search .................................. 202/83, 185.6, 202/185.3, 190, 245, 242, 189, 187; 203/10, 100; 159/14, 15; 165/86, 147; 126/381; 392/325

[56] References Cited

U.S. PATENT DOCUMENTS

| | | |
|---|---|---|
| 364,199 | 5/1887 | Coyle . |
| 473,164 | 4/1892 | Rochlitz . |
| 818,831 | 4/1906 | Kleitz . |
| 861,485 | 7/1907 | Stokes . |
| 999,793 | 8/1911 | Jewell . |
| 2,614,816 | 10/1952 | Hull . |
| 3,340,157 | 9/1967 | Weiss . |
| 3,350,279 | 10/1967 | Tolchin ........................................ 202/83 |
| 3,351,536 | 11/1967 | Fox ............................................ 202/83 |
| 3,507,753 | 4/1970 | Jacuzzi . |
| 3,870,605 | 3/1975 | Sakamoto ................................... 202/83 |
| 3,935,077 | 1/1976 | Dennison . |
| 3,980,526 | 9/1976 | Kirschmann . |
| 4,052,267 | 10/1977 | McFee . |
| 4,081,750 | 3/1978 | Weiss . |
| 4,089,750 | 5/1978 | Kirschmann et al. . |
| 4,187,150 | 2/1980 | Rich . |
| 4,339,307 | 7/1982 | Ellis, Jr. . |
| 4,342,623 | 8/1982 | Loeffler ...................................... 202/83 |
| 4,607,501 | 8/1986 | Vanlier ....................................... 202/234 |
| 4,715,433 | 12/1987 | Schwarz et al. .......................... 165/110 |
| 4,861,435 | 8/1989 | Sweet, Jr. . |
| 4,882,012 | 11/1989 | Wasserman . |
| 4,894,123 | 1/1990 | Helmich . |
| 4,917,770 | 4/1990 | Asbury et al. . |
| 4,943,353 | 7/1990 | Shannon . |
| 5,035,111 | 7/1991 | Ellerbe, Jr. . |
| 5,178,734 | 1/1993 | Palmer . |
| 5,203,970 | 4/1993 | Ellis, Jr. . |
| 5,266,170 | 11/1993 | Weber et al. . |
| 5,286,350 | 2/1994 | Huang . |
| 5,368,698 | 11/1994 | Field et al. . |
| 5,409,126 | 4/1995 | DeMars .................................... 220/4.27 |
| 5,492,602 | 2/1996 | Vogelman et al. . |
| 5,565,065 | 10/1996 | Wang ......................................... 203/10 |

FOREIGN PATENT DOCUMENTS

| | | |
|---|---|---|
| 1169908 | 9/1958 | France . |
| 2502969 | 10/1982 | France . |

*Primary Examiner*—Virginia Manoharan
*Attorney, Agent, or Firm*—Jones, Tullar & Cooper, PC

[57] ABSTRACT

A portable distiller convertible between an operating mode and a storage mode which permits easy transport includes a boiler vessel, a condenser, and a collection container. The condenser is mounted on a two-way lid which engages the top of the boiler in an operating mode to support the condenser over the boiler. The lid is insulated to prevent the transfer of heat from the boiler to the condenser. The lid is reversible to allow the condenser to be inserted into the boiler vessel for storage. The container may also be stored in the boiler, and preferably receives the condenser for storage.

22 Claims, 13 Drawing Sheets

CONVERTIBLE DISTILLATION APPARATUS

BACKGROUND OF THE INVENTION

The present invention relates, in general, to a distillation device for the purification of water, and more particularly to a convertible distiller wherein a collector vessel and a condenser may be securely stored within a boiler for ease and convenience of transport.

The global need for sources of safe, potable water is well known, particularly by international travelers, by people who work in impoverished areas of the world, by rescue workers in disaster areas, and the like. In these and other circumstances, the lack of reliable sources for pure, clean, portable water is acute, and there is a recognized need for a compact, light weight, highly transportable water purification device. Such a device is not only desirable in these circumstances, but may be essential to protecting travellers and rescue workers from serious water-borne diseases.

In addition to being portable, such a device, in order to be widely available, must be inexpensive, and also must be very reliable. Because remote areas or areas damaged by earthquakes, flood or other disasters are unlikely to have electrical power available, a suitable water purification device must also be capable of operating with a variety of fuels. Further, the device must be simple, easy to operate, durable, and most of all must be highly effective in the purification of water.

SUMMARY OF THE INVENTION

It is the primary objective of the present invention to address the need for safe, potable water by providing a transportable water distiller which may be converted from a distilling mode to a storage mode for ease and convenience of transport.

It is a further object of the invention to provide a potable water distiller that is compact in size in its operational mode, and may be converted to a storage mode that is even more compact, to save valuable space in transportation.

It is another object of the invention to provide a convertible distiller which, in its storage mode, is small enough to be carried by an individual in a small enclosure such as a small suitcase, an overnight bag, or a backpack.

It is another object of the invention to provide a convertible distiller that is of simple construction, is durable, and is of high quality to produce safe potable water.

It is another object of the invention to provide a distiller that is operable with a variety of heat sources, including electricity, gas, or wood.

A still further object of the invention is the provision, in a compact distiller, of a fan for enhancing the flow of ambient air to increase heat exchange in the condenser and wherein the fan may be powered by steam produced by the distiller itself.

It is another object of the invention to provide a source of potable water that requires no filters or chemicals, is easy to clean, and is not only functional, but is aesthetically pleasing.

Briefly, the present invention is directed, in its preferred forms, to a simple, high quality, durable, cost effective and compact distillation system which can be converted from an operating mode to a storage mode for easy transportation. The device of the invention is well suited for travellers, can be used conveniently in hotels, motel rooms, homes or apartments, and can be alternatively adapted for field use, where electricity may not be readily available.

Although the invention is described herein in terms of a small, personalized distiller, it will be understood that the size of the device is not limited, and the invention can be large enough for commercial as well as individual applications without departing from the advantages of the invention as described herein. It will also be apparent that the distiller of the invention, although described in terms of a batch-type distiller, is also readily adaptable to a continuous mode of operation.

The convertible distiller of the invention incorporates a primary heating vessel, or boiler, which receives the water which is to be treated. A heat source, which may be electricity, gas, wood, or other available fuel, is provided to boil the water in the boiler to produce steam which is directed into a condenser. The condenser provides heat exchange surfaces to allow the steam to condense, and the resulting distilled water is directed into a collector vessel.

In accordance with one form of the invention, the boiler, which may be in the form of an open pot or pitcher, is supported on or above a base which houses an electric heat source such as a heating plate or coil. The base also houses suitable connections for a control switch, a water level sensor, a fan motor, and the like for operating the device. The open top of the boiler is closed by a double-acting insulating lid which is permanently attached to the condenser, and a steam port through the lid leads to the condenser inlet, with the outlet of the condenser leading to a collector vessel which preferably is placed adjacent to the boiler. The heat source for the boiler preferably is located immediately below the bottom surface thereof, and may be permanently attached to the bottom of the boiler, if desired. The double-acting lid for the boiler incorporates an insulator to prevent heat from reaching the condenser and includes an air intake to allow cooling air to be drawn into a housing surrounding the condenser.

The condenser housing, which preferably is attached to the lid, encloses a coil of finned tubing which is seated on, and fastened to, the top of the lid. Centered within the coil is a dead air space tube which is attached at its lower end to the air intake lid, with the central tube and the housing forming an air passageway which directs air over the coil of finned tubing. An electric fan, such as a muffin fan, may be mounted above the cooling coil to draw air through numerous air intake port holes in the lid, the air passing upwardly through the cooling passageway to remove heat radiating from the finned tubing. The warm air is exhausted through the fan.

In the preferred form of the invention, the collector vessel and the condenser may be securely stored inside the boiler to convert the distiller from its operating mode to its storage mode to facilitate transport. To store these items, the electrical cords leading to the heater and the fan are unplugged and the condenser is lifted off the boiler, inverted and placed inside the collector which is placed inside the boiler. The components are secured to make a small, compact distiller unit.

An alternative embodiment of the present invention is particularly well suited for field use, where electricity may not be readily available. In this case, the distiller does not incorporate a base or electrical components or circuity, but it is adapted to be heated from other available sources such as gas, wood, or canned heat such as Sterno. If wood is to be used, a metal ring slightly larger in diameter than the boiler may be provided for receiving hot coals. In this embodiment, a steam turbine may be provided to drive the fan and to thereby increase the flow of ambient air around the condenser surfaces. This embodiment may also be converted for easy transportation by placing it in a storage mode such as that described above.

Although several embodiments are illustrated herein, it will be understood that the specific size, shape and dimensions of the distiller can be selected for particular applications. The value-engineering of the invention provides a convertible distiller with few parts and thus with a low manufacturing and assembly cost and a consequent reduction in the use of natural resources. The potable water source provided by the present invention requires no filters or chemicals and can be easily cleaned for use over a long period of time.

BRIEF DESCRIPTION OF THE DRAWINGS

The foregoing, and additional objects, features and advantages of the present invention will be more fully understood by reference to the following detailed description of preferred embodiments thereof, taken in conjunction with the accompanying drawings in which.

DESCRIPTION OF PREFERRED EMBODIMENTS

Figure 1:
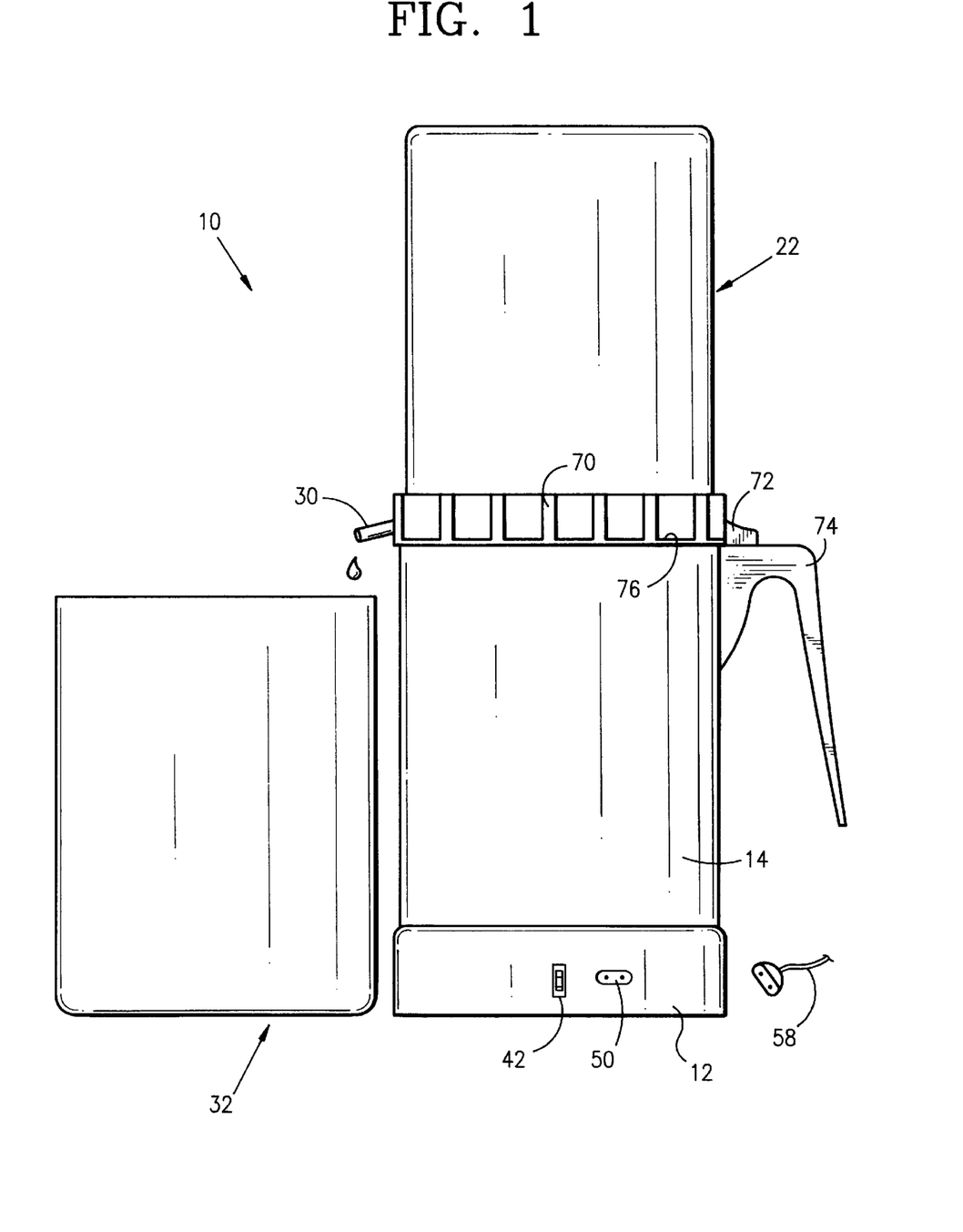
FIG. 1 is a side elevation view of a distiller in its operating mode and constructed in accordance with the present invention.
Figure 2:
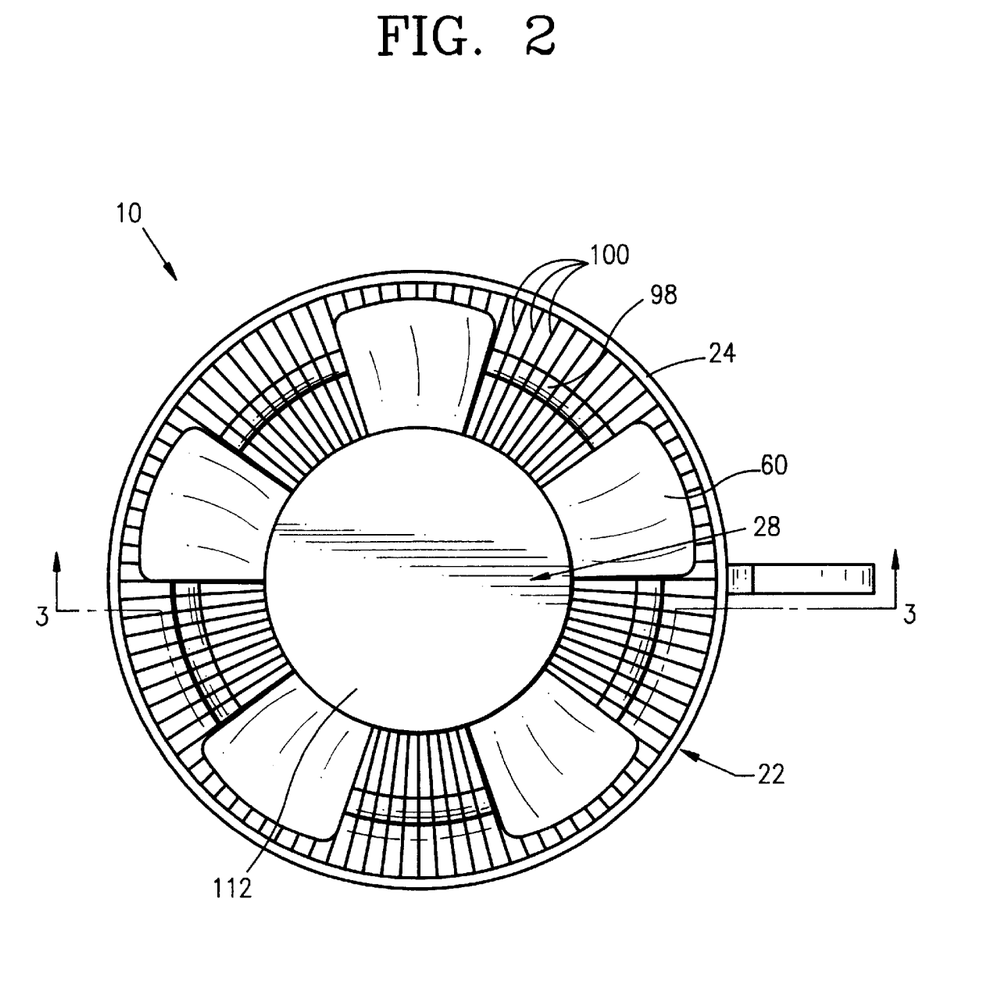
FIG. 2 is a top plan view of the distiller of FIG. 1.
Figure 3:
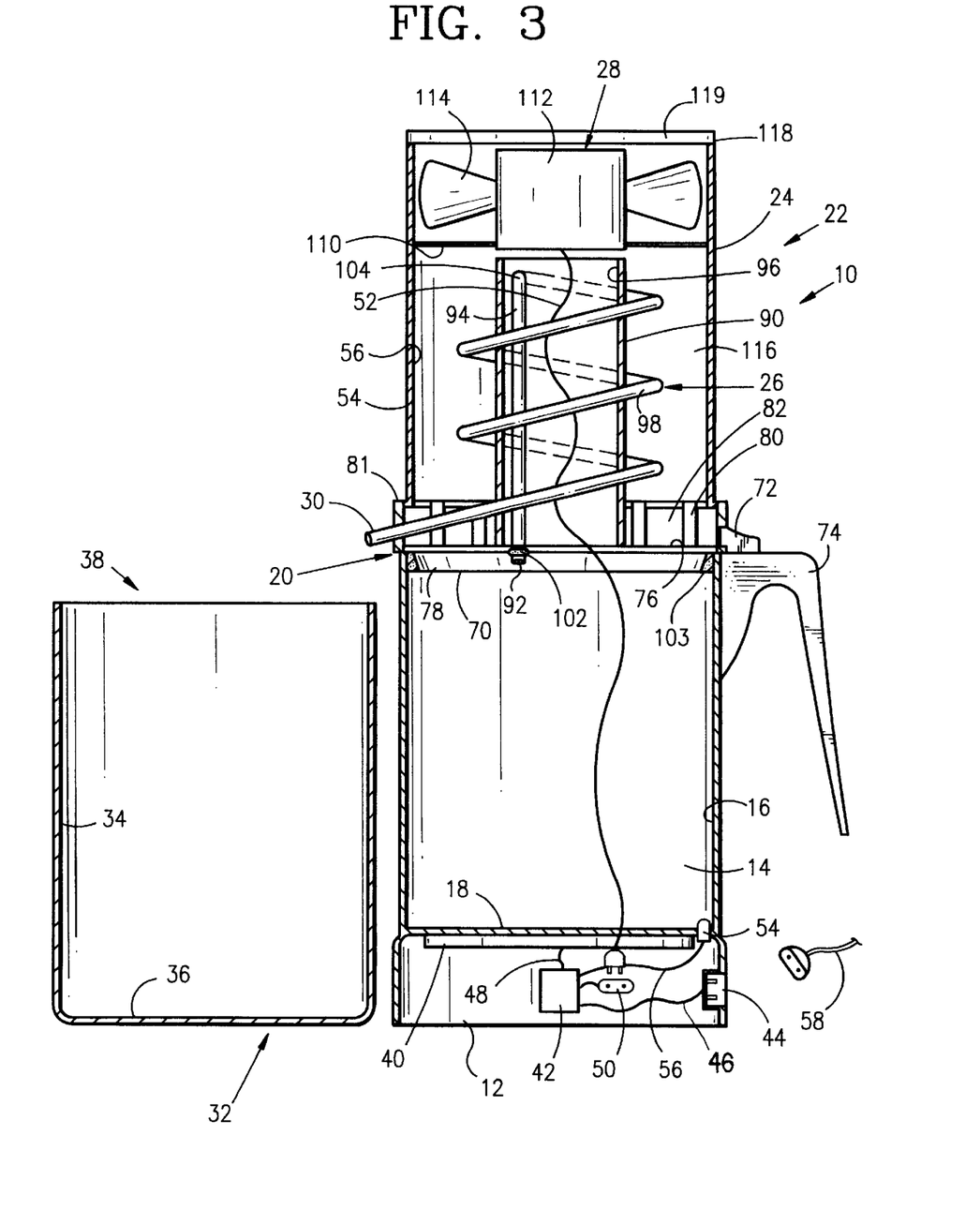
FIG. 3 is a partial cross-sectional view of the distiller of FIG. 1, taken along lines 3—3 of FIG. 2, with the cooling fins for the condenser being omitted for clarity.

Turning now to a more detailed consideration of the present invention, there is illustrated in FIGS. 1, 2 and 3 a travel model convertible distiller generally indicated at 10. The distiller includes a base 12 which supports a boiler 14 in the form of an open-top pot, or container, having a side wall 16, a bottom wall 18, and an open upper end 20. Supported in the open upper end 20 is a condenser assembly generally indicated at 22 which includes a condenser housing 24 containing a condenser coil 26 and a cooling fan 28. A condenser outlet forms a spout 30 at the end of coil 26 which directs condensed liquid into a collector vessel generally indicated at 32 and having a side wall 34, a bottom wall 36 and an open top 38. Preferably, the boiler, the condenser housing and the collector vessel are generally cylindrical, as illustrated, although other cross-sectional shapes can be used.

In a preferred form of the invention, a heat source 40 such as an electric heater is disposed within the base 12, preferably being supported at the top of the base so that it provides a surface on which the boiler 14 may rest. In an alternative construction, the base may be a part of, or an extension of, the boiler 14 and the electric heater may be secured to the exterior surface of the bottom 18 of the boiler. The base 12 includes a suitable on-off switch 42 connected between a power inlet receptacle 44 and the heater element 40 by power lines 46 and 48. The switch 42 may also be connected to provide power to a fan receptacle 50 to which the cooling fan 28 may be connected by way of line 52. A level sensor 54 may be incorporated in the boiler 14 and connected by way of line 56 to switch 42 to ensure that the heater element 40 is not turned on when there is no water in the boiler and to automatically turn the heater off before water is completely boiled away to prevent the build-up of scale. The heating element 40 may incorporate a suitable thermostatic control for maintaining its temperature at a desired level, and receptacle 44 in base unit 12 may be connected to a suitable source of power by way of power line 58.

An insulating lid 70 is received in the open end 20 of the boiler 14 and is secured therein by a thumb latch 72 mounted above a handle 74 and secured to the wall 16 of boiler 14. The thumb latch 72 may be spring-loaded, if desired, and latches over the top surface 76 of lid 70. The lid incorporates a tapered wall portion 78 which engages the inner surface of the open end 20 of the boiler, with a suitable flexible gasket being provided between the lid and the boiler side wall or between the lid and the top edge of the boiler. The upper portion of lid 70 carries an upstanding wall 80 which may be generally cylindrical and which receives and is secured to a lower end of condenser housing 24, leaving an outer shoulder 81 around the housing. The upper wall portion 80 of the lid incorporates a multiplicity of air inlet windows 82 through which cooling air can flow from outside the distiller into the condenser housing.

Mounted on the top surface 76 of lid 70 and concentric with housing 24 is a dead air space tube 90 extending from the surface 76 upwardly through the housing to the fan 28. Tube 90 is preferably generally cylindrical, although other cross-sectional shapes may be used, as desired.

Extending upwardly through lid 70 is a steam port 92 which leads to a steam feed pipe 94 extending vertically upwardly through the interior of tube 90 and through a hole in its side wall 96, where it is connected to the top end of condenser 26. The pipe 94 extends through the wall 96 for connection to the top end of the condenser coil 98.

FIG. 3 illustrates the coil 98 without cooling fins; however, it will be understood that, as illustrated in FIG. 2, the condenser coil 98 preferably consists of a metal tubular pipe, such as stainless steel, carrying closely spaced metal cooling fins 100, in conventional manner. As illustrated, the cooling coil 98 extends around the exterior of dead air tube 90, between the wall 96 of the tube and the housing 24, the cooling coil 98 spiraling downwardly around the dead air tube to the outlet 30 which extends through one of the air intake holes 82. As illustrated in FIG. 2, the fins 100 are in heat exchange relationship with coil 98 and are of sufficient size to essentially fill the cooling air space between tube 90 and housing 24 for maximum cooling effect.

A steam port gasket 102 surrounds the steam port 92 and a gasket 103 is provided between lid 70 and the upper edge 20 of boiler 14 to prevent escape of steam to the atmosphere. The cooling coil 98 is supported at its upper end 104 by the tubing wall 96 and at its lower end 30 by the lid 70. If additional support is needed, suitable support arms may be provided between wall 96 and coil 98 along the length of the coil.

The fan motor 28 is mounted in the upper end of housing 24, as by a conventional fan spider mount 110. The fan motor 112 drives fan blades 114 which are aligned with the annular cooling air space 116 between tube 90 and housing 24, as illustrated in FIGS. 2 and 3. The fan draws ambient air into the interior of housing 24 through the windows, or openings 82, upwardly through the annular space 116 around condenser coil 98 and fins 100, and out through the open end 118 of housing 24. If desired, a suitable grill or finger guard 119 may be mounted on the open end 118 to prevent easy access to the fan blades 114. The power cord 52 leading to motor 112 from receptacle 50 may pass through the interior of tube 96, as illustrated, and may lead out through a port in the wall 96 and through one of the windows 82 to the exterior of the boiler 14, where it may be plugged into the receptacle 50 mounted on the outer wall of base 12.

In operation, water to be purified is placed in boiler 14 and the condenser unit 22 is positioned in the open end 20 of the boiler, in the manner illustrated in FIG. 3. The heating element 40 is energized and the water is brought to a boil, with vapor from the boiling water being conveyed through the steam port 92 upwardly through steam feed pipe 94 into the condenser coil 98. Air flow through the annular space 116 cools the steam in coil 98, condensing it into distilled water as it travels downwardly toward the outlet 30, with the distilled water being directed into the collector vessel 32.

Figure 4:
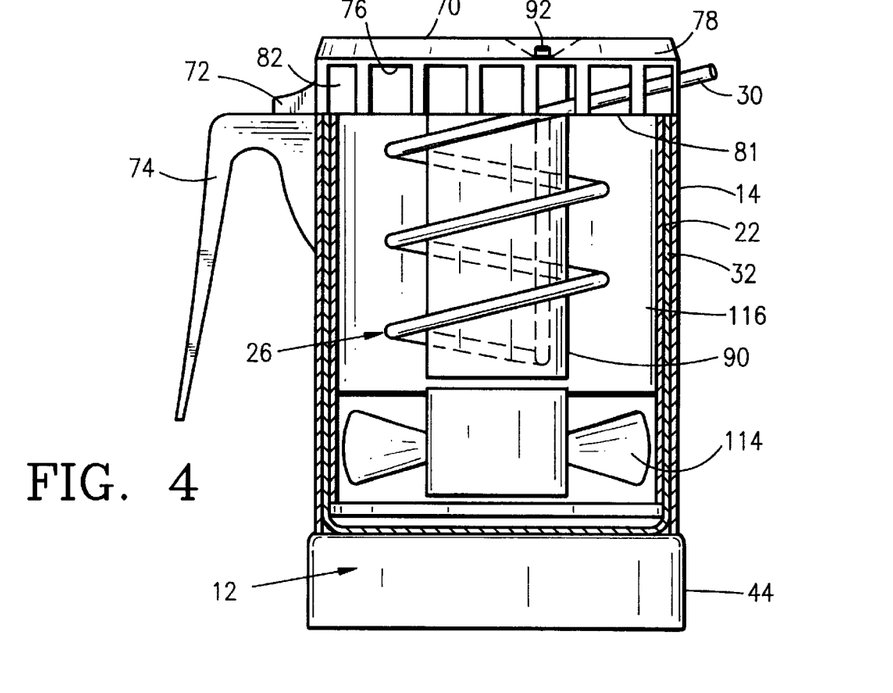
FIG. 4 is a partial cross-sectional view of the device of FIG. 3 converted to its storage mode.
Figure 5:
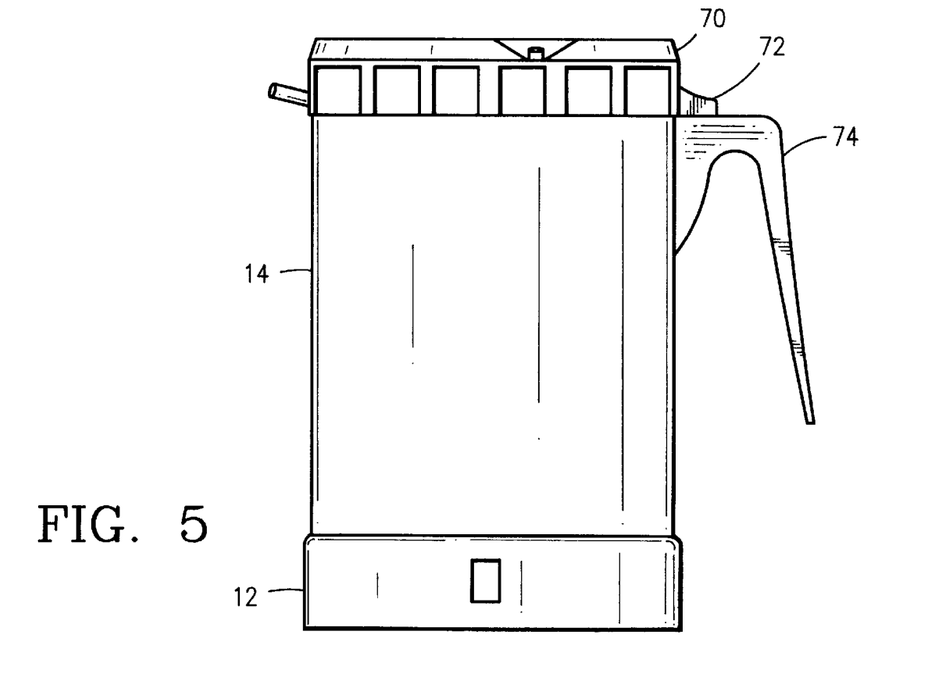
FIG. 5 is a side elevation view of the distiller of FIG. 4.

FIG. 4 is a side elevation view, in partial section, illustrating the distiller of FIGS. 1 through 3 when converted to the transfer mode. In this case, the collector vessel 32 and the condenser assembly 22 are securely stored within the boiler 14. This is accomplished by removing the condenser assembly from the boiler (FIG. 3), inserting the collector into the boiler, and then inverting the condenser unit and placing it within the collector vessel so that the lid unit 70 is now inverted with its top edge, or shoulder 81 engaging the open end 20 of the boiler to form a closure. The assembled device may be secured in place by the latch 72 engaging a corresponding shoulder (not shown) on the lid 70. The assembled device in its storage mode is illustrated in side elevation in FIG. 5.

Figure 6:
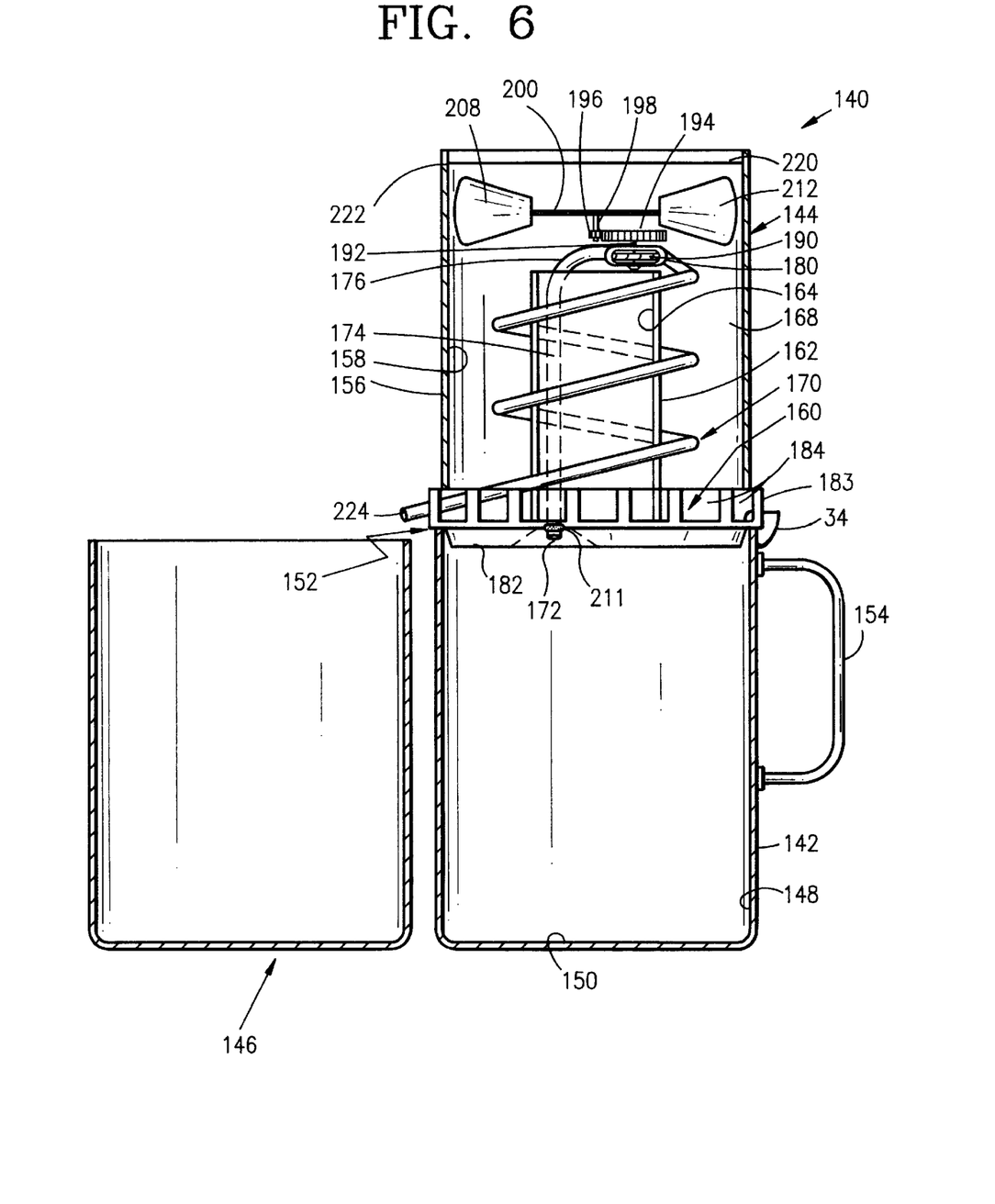
FIG. 6 is a partial cross-sectional view of a second embodiment of the invention, illustrating a distiller for use with alternative fuels and illustrating the use of a turbine-driven cooling fan.

FIG. 6 illustrates in partial cross-sectional view a second embodiment of the present invention which omits electrical connections and which is designed for field use with a variety of heat sources. The field use embodiment is generally indicated at 140 in FIGS. 6, 7 and 8 and includes a boiler 142, a condenser assembly 144, and a collector vessel 146. The boiler 142 is similar to the boiler 14 illustrated in FIG. 3, but does not incorporate the heater element 40 of that embodiment. Instead, boiler 142 may be utilized with any available heat source. If electricity is available it may be used with a conventional electric hot plate, but it also is capable of being used with canned heat, a wood fire, a wood stove, a gas burner, or the like. The boiler is preferably fabricated of stainless steel, although other metals such aluminum may be used, if desired.

Figure 8:
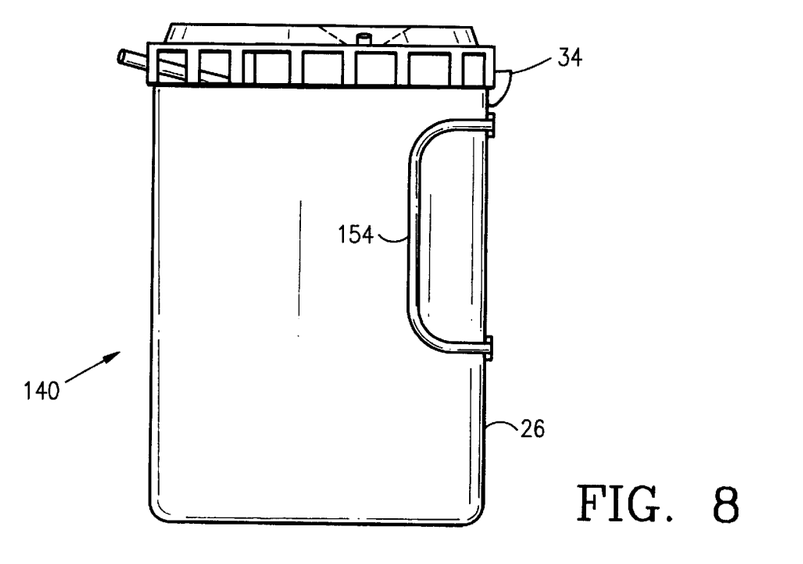
FIG. 8 is a side elevation view of the distiller of FIG. 6, converted to its storage mode.

The boiler 142 includes a cylindrical side wall 148, a bottom wall 150, and an open top 152, and incorporates a handle 154 which may be similar to that of the previous embodiment, or may be hinged to the side wall 148 so that it can be folded away, as illustrated in FIG. 8. The condenser assembly 144 is similar to the condenser assembly of FIG. 3, and thus includes a housing 156 incorporating a cylindrical side wall 158 mounted on an insulated lid 160. The lid 160 carries a central tube 162 having a cylindrical side wall 164 which cooperates with the housing 156 to produce an annular air space 168 in which condenser coils 170 are mounted.

Extending through lid 160 is a steam port 172 leading to a steam feed pipe 174 which leads upwardly and through tube 162 for connection at its outlet end 176 to a turbine housing 180. The output of the turbine is connected to the cooling coil 170.

As with the previous embodiment, the lid 160 incorporates a gasket between a lower, inwardly tapered insulating section 182 of the lid and the top rim 152 of the boiler 142. This gasket provides a seal between the lid and the boiler to force steam through the outlet port 172, while the insulating portion prevents heat from the boiler from reaching the condenser coil. The upper part of the lid 160 incorporates a wall 183 having air intake windows 184, as previously described to admit air into the space 168 for cooling the condenser coils 170.

Figure 7:
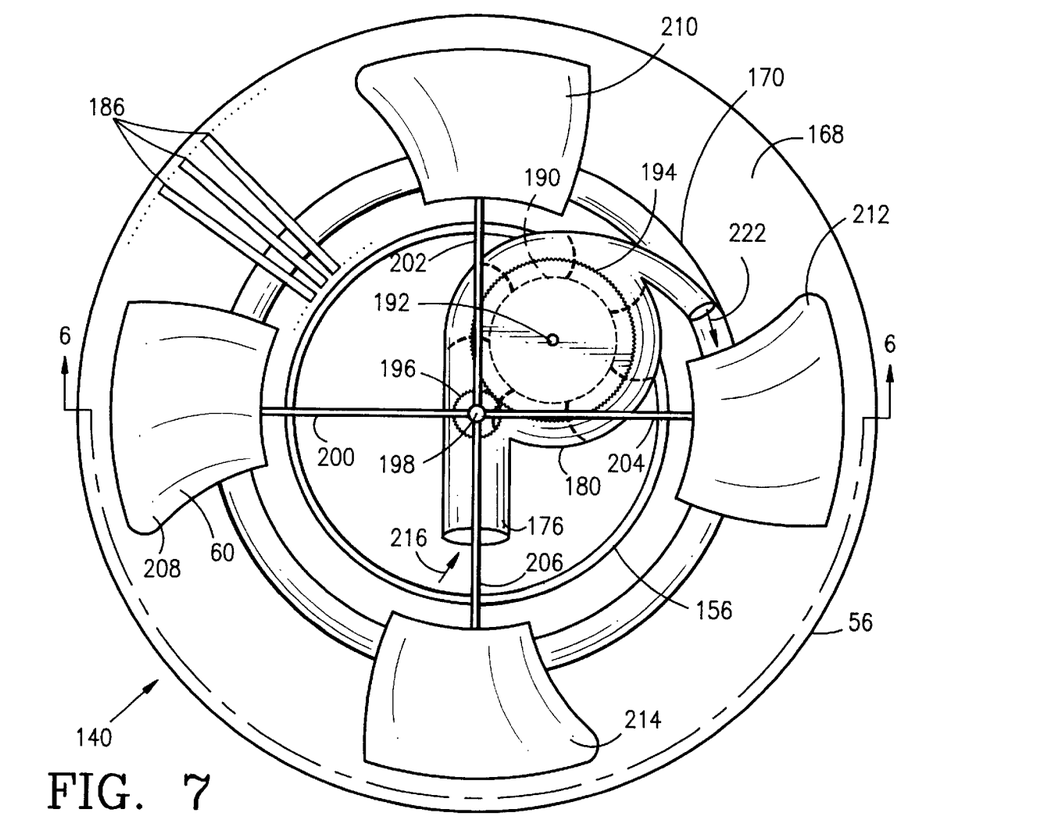
FIG. 7 is an enlarged plan view of the distiller of FIG. 6, illustrating the turbine fan drive mechanism.

As illustrated in the top plan view of FIG. 7, the cooling coils 170 carry a multiplicity of closely spaced cooling fins 186 in the manner described with respect to the fins 100 of the first embodiment, these fins being mounted on the cooling tubes in heat exchange relationship for dissipating the heat from the steam and the condensed water passing through the coils. It will be noted that the steam feed section 174 leading to the cooling coils does not include fins.

The steam turbine 180 illustrated in FIGS. 6 and 7 includes a rotor, or impeller, 190 supported on a drive shaft 192 mounted in the turbine housing 180. On the upper end of shaft 192 is a primary drive gear 194 which is driven by impeller 190.

A secondary, or driven gear 196 is mounted on a second shaft 198 which is supported on the steam feed pipe 176. Shaft 198 rotates with gear 196 and carries at its upper end fan blade support arms 200, 202, 204 and 206 which carry at their outer ends respective fan blades 208, 210, 212 and 214. The flow of steam, indicated by arrow 216 through feed pipe 176 into the turbine 180 causes impeller 192 rotate, thereby rotating gear 194 and secondary gear 196. The secondary gear drives shaft 198 and the fan blade 208, 210, 212 and 214 to draw air upwardly through the cooling chamber 168 in which the condenser coil 170 is located. The turbine thus eliminates the need for a separate power source for the cooling fan, the fan being driven by the steam to enhance the heat exchange in the cooling coil.

As discussed with respect to the first embodiment, a steam port gasket 211 surrounds the outlet port 172 to seal the tubing 174 where it protrudes through the insulator lid 160. A finger guard 220 may be placed over the open upper end 222 of the condenser housing 156, if desired.

In operation, the boiler 142 is filled with water and is placed over a suitable heating source to cause the water to boil. Vapor from the boiling water is conveyed through the steam port 172 upwardly through feed pipe 174 into the steam turbine 180. The steam then passes out of the turbine and, as indicated by arrow 222, is directed into the cooling coil 170, where the steam is condensed into distilled water as it travels downwardly toward an outlet 224. Distilled water from the outlet 224 is delivered to collector vessel 146 which, as previously described, preferably is cylindrical and is sized to fit within the boiler 142 and also to receive the condenser assembly 144.

As illustrated in FIG. 8, the distiller may be converted from its operational mode illustrated in FIG. 6 to a storage mode wherein the collector vessel 146 is located within the boiler 142 and the condenser assembly 144 has been inverted and placed within the collector vessel.

Another embodiment of the present invention, representing an alternative for the travel model convertible distiller of FIGS. 1 through 5 or for the field model convertible distiller of FIGS. 6 through 8, is illustrated in FIGS. 9 through 13 at 240. In common with the previously described embodiments, distiller 240 incorporates a boiler 242, a condenser assembly 244 and a collector vessel generally indicated at 246. In this embodiment, the distiller elements 242, 244 and 246 are illustrated as being generally rectangular in cross-section, although other crosssectional shapes could be used, if desired.

Figure 9:
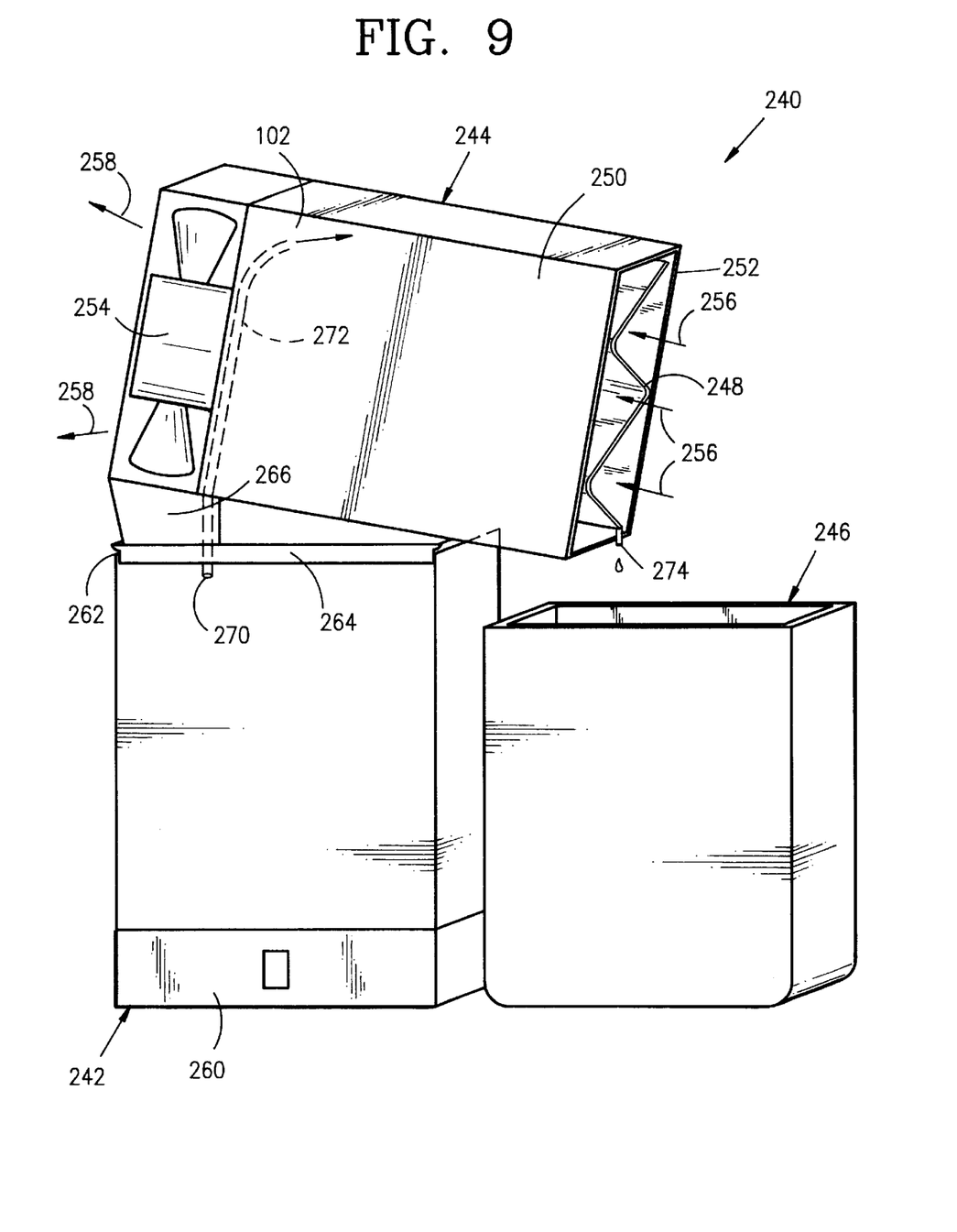
FIG. 9 is a perspective view of a third embodiment of the distiller of the present invention, illustrating a condenser having planar cooling surfaces.

A primary difference between the distiller 240 and the previously described embodiment is the provision of a planar condenser 248, contained in the condenser housing 250. The housing is open at its lower end 252 and incorporates a cooling fan 254 at its upper end to draw air through the housing in the direction of arrows 256 across the cooling plates (to be described) of the condenser 248, the fan exhausting the cooling air out the upper, or left-hand end of the condenser assembly 244 as indicated by arrows 258.

The boiler 242 rests on a base 260 which may incorporate an electrical heating element in the manner described with respect to FIG. 3, although for nonelectric heating the base 260 can be omitted. The open upper end 262 of the boiler is closed by an insulating lid 264 which incorporates a suitable bracket 266 for receiving and securing the condenser unit 244. The lid includes a steam exit port 270 which directs steam from the boiler 242 upwardly through a steam feed pipe 272 to an inlet at the upper end of the condenser element 248, as will be described. The steam flows through the condenser element, is cooled, and distilled water is directed from the condenser outlet 274 into the container 246.

Figure 10:
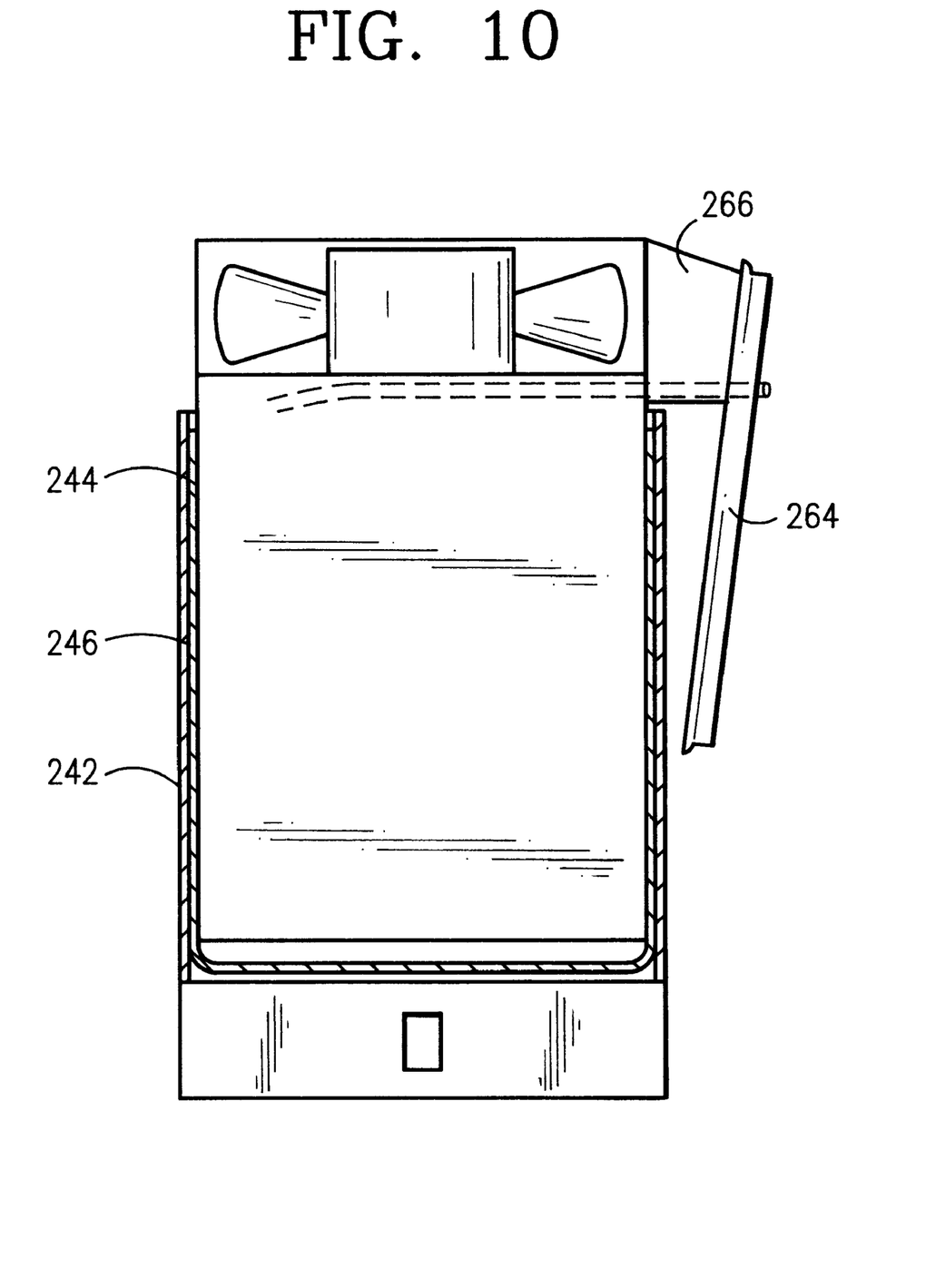
FIG. 10 is a side elevation view of the distiller of FIG. 9 in its storage mode.

As illustrated in FIG. 10, the collector vessel 246 can be placed inside the boiler 242 and the condenser unit 244 can be stored within the collector vessel 246 for transport. As illustrated, in this embodiment the lid 264 remains connected to the condenser unit by means of bracket 266 so that upon assembly in the storage mode, the lid 264 remains outside the boiler 242. A suitable thumb latch may be provided to secure the parts together, as previously described, and a carrying handle may be provided on the exterior surface of the boiler, if desired.

Figure 11:
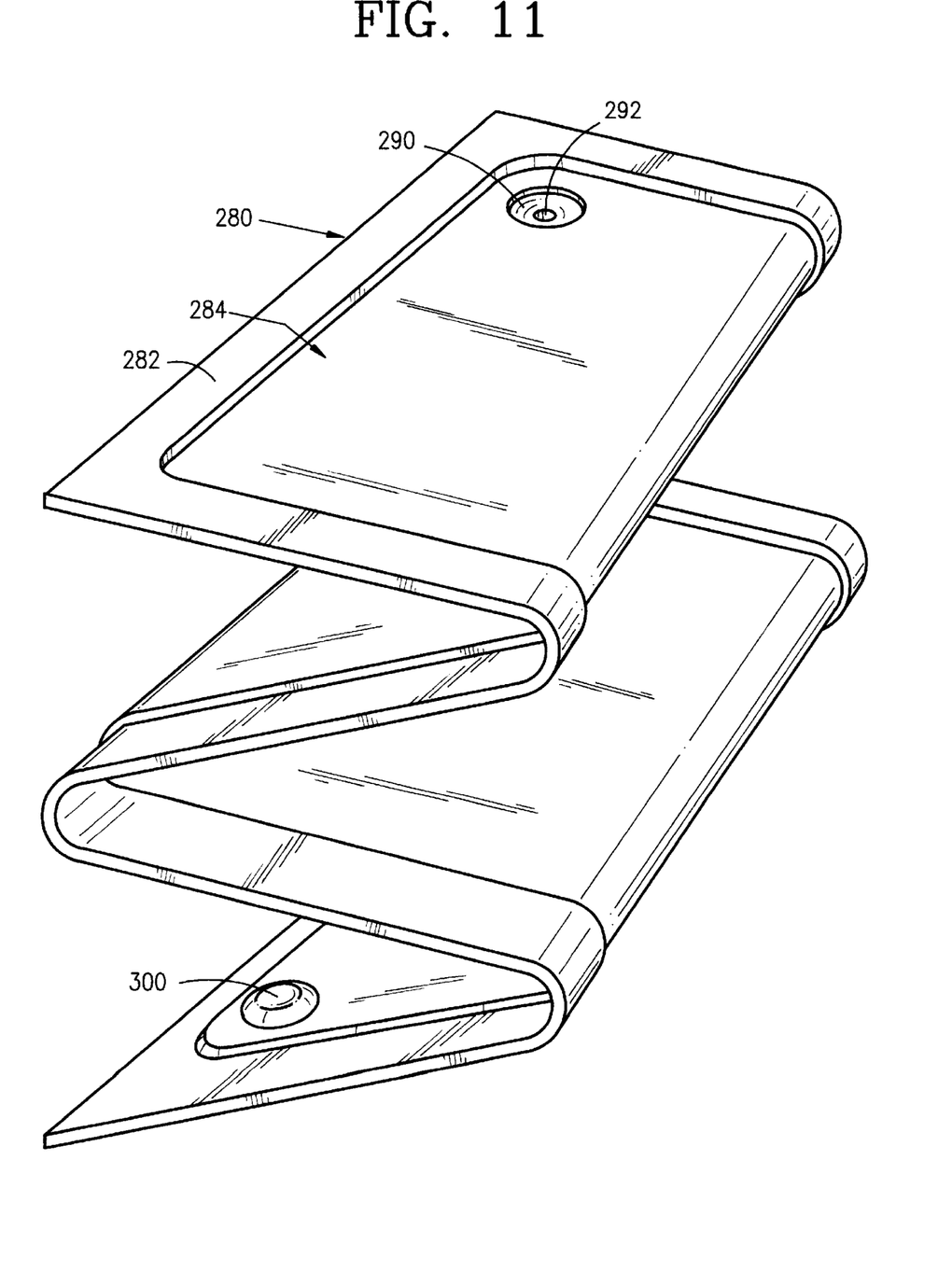
FIG. 11 is an enlarged perspective view of a component of the planar condenser of FIG. 9.

The planar condenser 248 preferably is made of two folded sheets of any suitable material such as stainless steel, coated aluminum, or the like, the sheets being welded or otherwise secured together along their edges and shaped to form a central chamber. FIG. 11 illustrates a single sheet 280 which may be used in fabricating the condenser. As illustrated, the sheet is formed to define a peripheral flange 282 surrounding a recessed region, or chamber, 284. The flange provides a surface for receiving and securing a second, upper sheet 286 (FIG. 12) which covers the recess 284 to provide an enclosed steam condensing chamber defined by sheets 280 and 286. The sheet 280 includes at its upper end a steam inlet aperture 290 which includes an opening 292 connected to the steam feed line 272. The cover sheet 286 may incorporate a corresponding chamber 294 to accommodate the flow of steam into the interior chamber 284. Similarly, a water outlet aperture 300 is provided at the lower edge, preferably at the lower most corner, of the condenser for connection to the distiller outlet 274.

Figure 12:
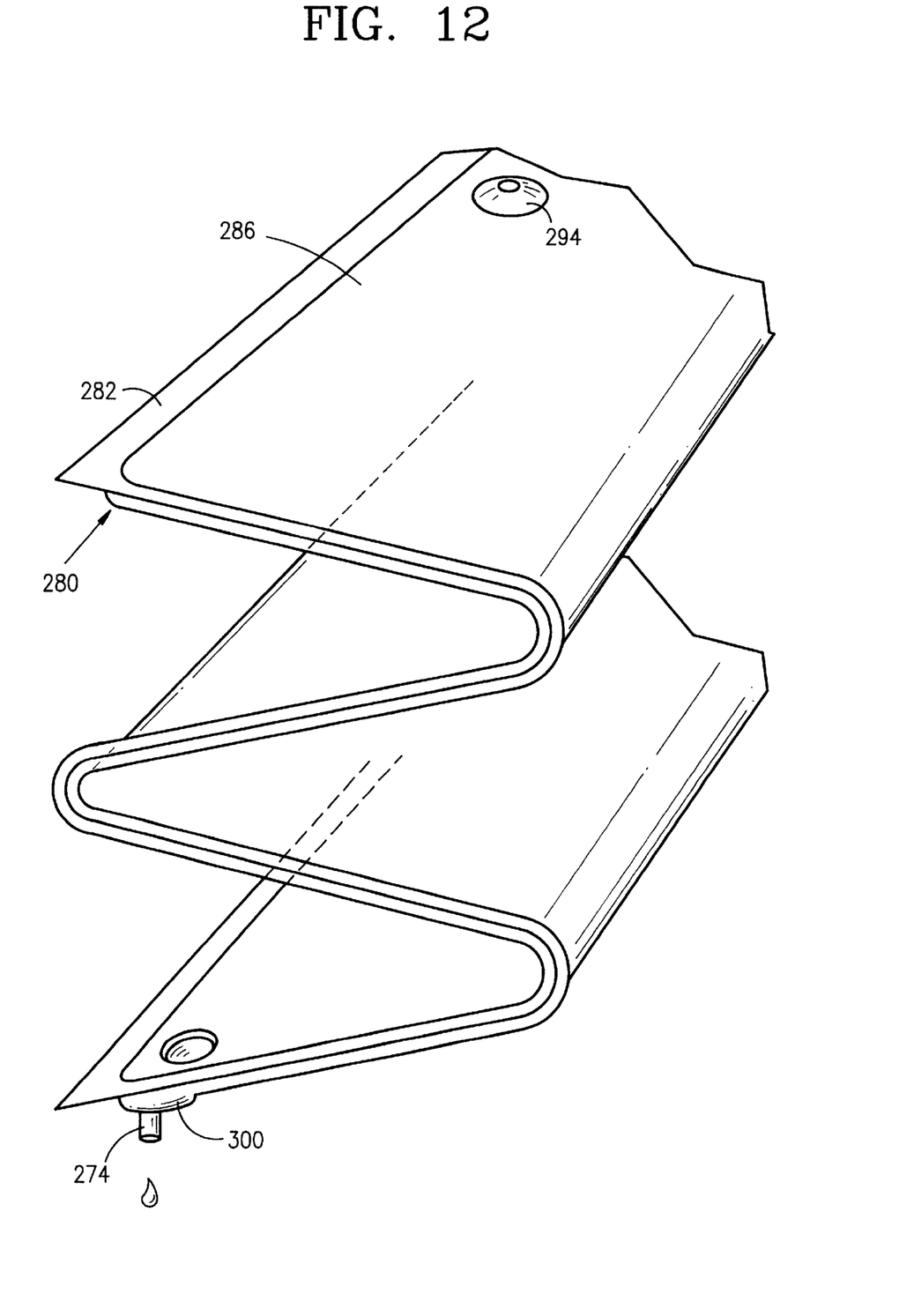
FIG. 12 is a partial perspective view of the planar condenser of FIG. 9.

Although the top sheet 286 is illustrated as being flat, it will be understood that it may incorporate a recess similar to the recess 284, although extending in the opposite direction, to enlarge the condensing chamber.

Figure 13:
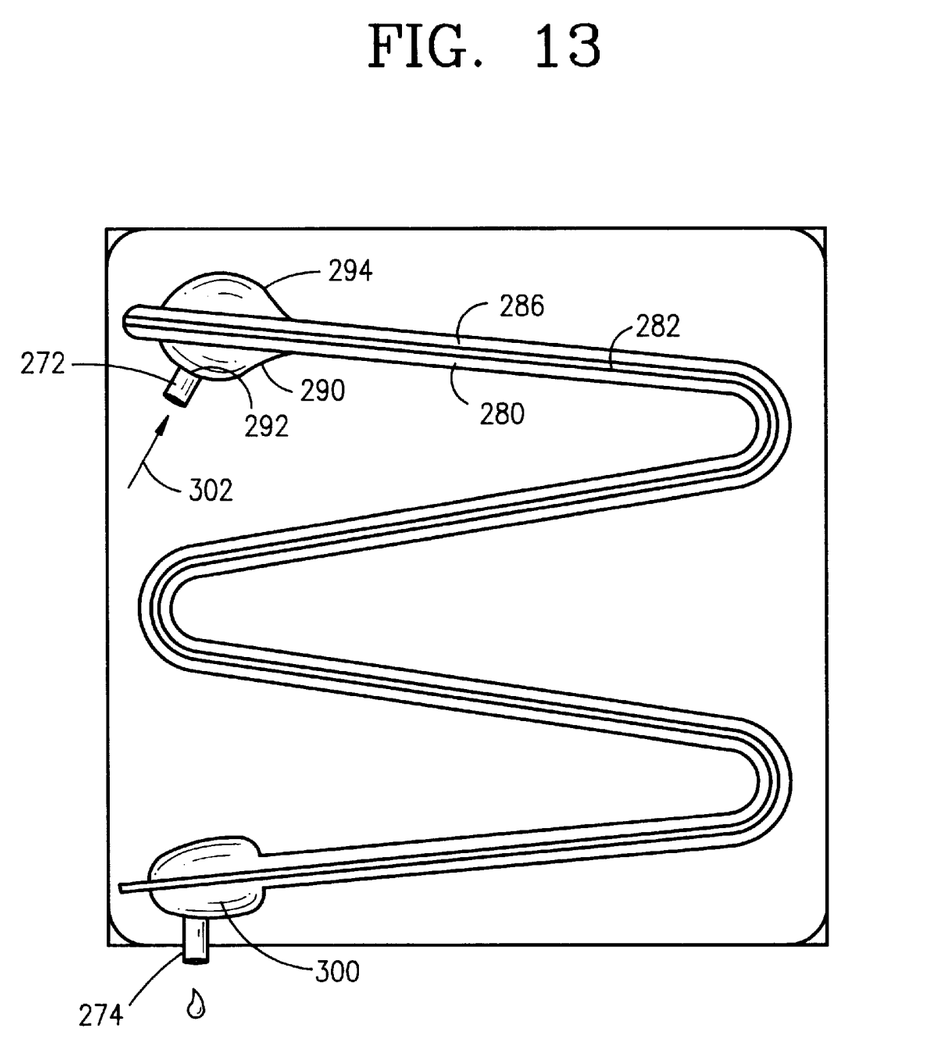
FIG. 13 is an enlarged, end elevation view of the condenser of FIG. 9, illustrating a steam inlet and distiller outlet.

The condenser of FIGS. 11, 12 and 13 is, in effect, a series of planar condensing chambers connected at corresponding ends to form a generally zig-zag configuration, as viewed in the end view of FIG. 13. Steam from boiler 242, as illustrated by arrow 302 in FIG. 13, enters the chamber at the uppermost end, and travels downwardly toward the lowermost corner exit aperture 300, the planar surfaces of the condenser cooling the steam and producing distilled water at the outlet 274. The two sheets 280 and 286 are secured along the flange 282 adhesively, by welding, or by any other suitable fabrication technique.

Figure 14:
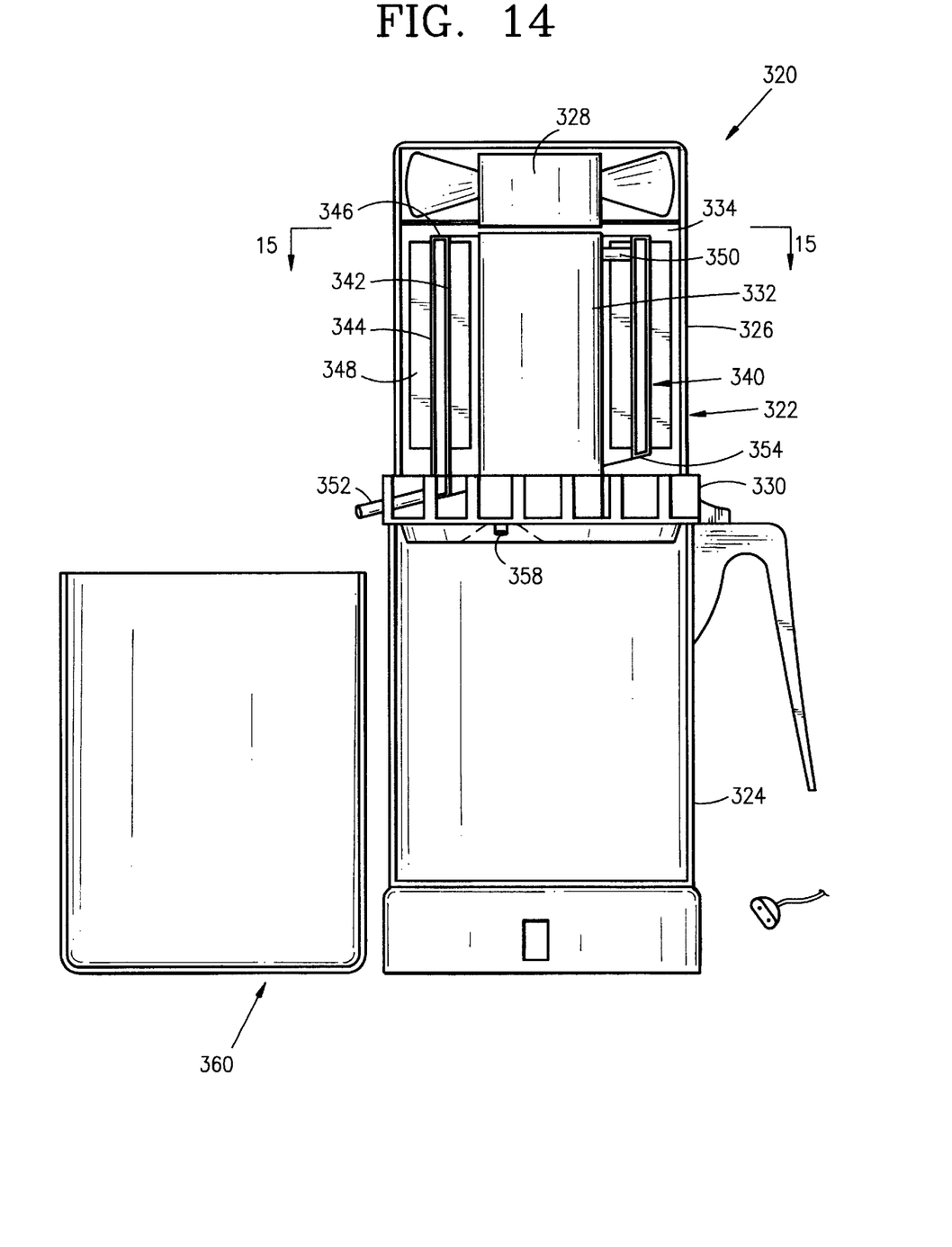
FIG. 14 is a partial cross-sectional view of another embodiment of the present invention, incorporating a vertical condenser.
Figure 15:
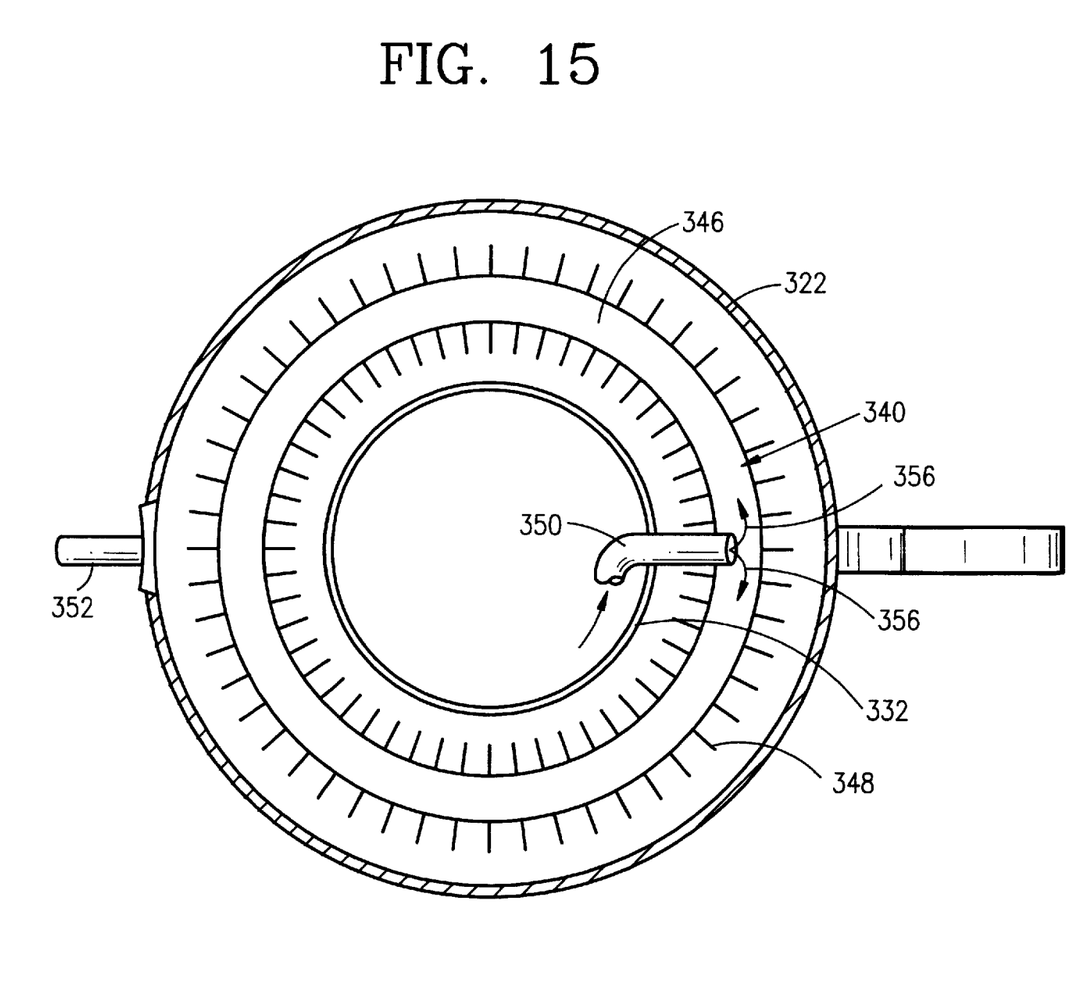
FIG. 15 is a sectional view taken along line 15—15.

A further embodiment of the distiller of the present invention is illustrated at 320 in FIGS. 14 and 15, this embodiment incorporating a modified condenser unit 322 mounted on a boiler 324 which may be similar to the boiler illustrated in FIGS. 1–4. The modified condenser of this embodiment includes a housing 326 carrying a cooling fan 328 at its upper end and mounted at its lower end on an insulating lid 330 which is secured in the open end of the boiler 324, in the manner previously described. The condenser assembly 322 incorporates a central tube 332 which is mounted on the lid to define a cooling air flow region 334 between the tube and the housing 326.

Surrounding the tube 332 and generally concentric with the tube is a vertical, annular condenser chamber 340 which includes inner and outer cylindrical side walls 342 and 344 and a top 346. A multiplicity of closely spaced cooling fins 348 are mounted on the inner and outer walls and are perpendicular thereto and in heat exchange relationship therewith to provide cooling surfaces for the vertical cooling chamber 340. A steam inlet feeder pipe 350 leads to the upper end of condenser chamber 340, while an outlet 352 is connected to the lower end of the chamber. The bottom wall 354 of chamber 340 slopes downwardly toward the outlet 352 to facilitate the flow of distilled water to the outlet.

FIG. 15 is a top perspective view of the convertible distiller of FIG. 14, further illustrating the relationship between the vertical condenser 340, the condenser housing 322 and the inner tube 332, with the arrows 356 showing the direction of steam flow from feeder pipe 350. Condenser components not specifically illustrated in FIGS. 14 and 15 may be similar to those of previously described embodiments.

In operation, this embodiment is also similar to previously described embodiments in that vapor or steam from the boiler 324 enters a steam port 358, travels upwardly through steam feeder pipe 350 to enter the vertical condenser 340. The steam condenses in the condensing chamber defined by inner and outer walls 342 and 344, and the resulting distilled water flows downwardly to the outlet 352 where it is received by a collector vessel 360. The distiller can be converted to its storage modes in the manner described above with respect to the preceding embodiments, thereby providing a compact unit for easy transport.

The distiller of the present invention is an exceptionally simple device which can be quickly converted into a very small, secure and compact unit for easy transport simply by storing the collector vessel and the condenser assembly inside the boiler. The device of the present invention provides a space-saving, compact, portable, high quality and durable, as well as cost effective unit for producing safe potable water. It will be seen that the unit can be quickly converted between its operational and storage mode for ease of use, and since it requires no filters or chemicals, it enjoys numerous advantages over prior devices.

Although the invention has been described in terms of preferred embodiments, it will be understood that these are merely exemplary of the invention, and numerous variations and modifications are possible. For example, the condensers can have a wide variety of shapes and forms, and the walls of the condenser chambers can be corrugated to increase the heat exchange surface area, or fins can be provided on the condenser illustrated in FIGS. 9–13. The device is easily adaptable to operate in a continuous mode rather than the batch mode described herein, and commercial devices of relatively large size can be provided without departing from the true spirit and scope of the invention as set out in the following claims.

What is claimed is:

1. A portable distiller convertible between an operating mode and a storage mode, comprising:
    a boiler for receiving liquid to be distilled, said boiler including side and bottom walls and an open top;
    a reversible lid for said boiler open top, said lid having a first position to sealingly engage said open top in an operating mode and having a second position to engage said open top in a storage mode;
    a condenser mounted on said lid and having an inlet and an outlet;
    a first passageway for conveying steam from said boiler to said condenser inlet when said lid engages said boiler open top in said operating mode, said condenser converting the steam to distillate;
    a collection container;
    means for conveying distillate from said condenser outlet to said collection container;
    said condenser being located outside said boiler when said lid is in said operating mode and being located within said boiler when said lid is in said storage mode.

2. The distiller of claim 1, wherein said collection container is located within said boiler in said storage mode.

3. The distiller of claim 1, wherein said first passageway comprises a tube leading from an exit port in said lid to an inlet end of said condenser.

4. The distiller of claim 1, wherein said condenser includes a plurality of generally planar condensing segments forming an elongated, thin chamber, said segments each sloping downwardly and being interconnected to cause steam to travel in a serpentine path from said condenser inlet toward said outlet and to cause said distillate to flow by gravity through said chambers to said condenser outlet.

5. The distiller of claim 4, further including air passages between adjacent segments.

6. The distiller of claim 1, wherein said condenser comprises a tubular, finned coil connected at its inlet end to receive steam and connected at said outlet end to said means for conveying distillate to said container, said coil providing a closed continuous path to cause steam to flow from said inlet end toward said outlet end.

7. The distiller of claim 6, further including a condenser housing mounted on said lid and surrounding said coil for directing ambient air around said coil to enhance heat transfer.

8. The distiller of claim 7, further including apertures in said lid for admitting ambient air into said housing.

9. The distiller of claim 8, further including an inner wall within said coil for directing ambient air over said coil.

10. The distiller of claim 7, further including a cooling fan mounted to said housing for causing ambient air to flow across said coil.

11. The distiller of claim 10, wherein said fan is driven by an electric motor.

12. The distiller of claim 10, wherein said fan is driven by a steam turbine.

13. The distiller of claim 12, wherein said steam turbine is mounted in said first passageway.

14. The distiller of claim 1, further including base means for supporting said boiler; and
    heating means in said base for supplying heat to said boiler.

15. The distiller of claim 14, wherein said heating means is an electric heater.

16. The distiller of claim 1, wherein said reversible lid is insulated to prevent heat from said boiler from reaching said condenser.

17. The distiller of claim 16, wherein said lid includes a first peripheral, upwardly tapered surface for sealingly engaging said boiler open top to position said condenser above said boiler in said operating mode and includes a second peripheral surface for engaging said boiler top when said lid is inverted to position said condenser within said boiler in said storage mode.

18. The distiller of claim 16, further including latch means for securing said lid on said boiler in either said operating mode or said storage mode.

19. The distiller of claim 1, wherein said condenser includes a vertical annular condenser chamber mounted on said lid.

20. The distiller of claim 19, said condenser further including a housing surrounding said condenser chamber, said housing being mounted on said lid.

21. The distiller of claim 20, further including apertures on said lid for admitting ambient air to said housing and a fan mounted in said housing for drawing said ambient air through said housing and across said cooling chamber.

22. A portable distiller convertible between an assembled operating configuration and a nested storage configuration, comprising:
    a boiler for receiving liquid to be distilled, said boiler including side and bottom walls and an open top;
    a reversible lid for said boiler open top, said lid having a first operating configuration for sealingly engaging said open top and having a second storage configuration for engaging said open top;
    a condenser mounted on said lid and located outside said boiler when said lid is in said operating configuration and having an inlet and an outlet, said condenser being dimensioned for enclosure within said boiler in said storage configuration of said lid;
    a first passageway for conveying steam from said boiler to said condenser inlet when said lid sealingly engages said boiler open top in said operating configuration, said condenser converting the steam to distillate;

a collection container located outside said boiler in said operating configuration of said distiller and dimensioned for enclosure within said boiler in said storage configuration of said distiller; and means for conveying distillate from said condenser outlet to said collection container, said collection container and said condenser being located outside said boiler when said distiller is in said operating configuration and being located within said boiler when said distiller is in said storage configuration, with said condenser being nested within said collection container.

* * * * *